United States Patent [19]

Legoy et al.

[11] 4,410,187
[45] Oct. 18, 1983

[54] SEALING DEVICE FOR ROTARY HYDRAULIC FLUID MACHINE

[76] Inventors: Auguste Legoy, 12 bis, rue René Coty, 76290 Montivilliers; Claude Legoy, 5, rue Hippolyte Fenoux, 76620 Le Havre, both of France

[21] Appl. No.: 366,072

[22] Filed: Apr. 6, 1982

[30] Foreign Application Priority Data

Apr. 8, 1981 [FR] France ................ 81 07065

[51] Int. Cl.³ .................. F16J 15/42; F16J 15/32
[52] U.S. Cl. .................. 277/25; 277/205
[58] Field of Search ............. 277/25, 15, 68, 205

[56] References Cited

U.S. PATENT DOCUMENTS

| | | | |
|---|---|---|---|
| 2,352,336 | 6/1944 | Martin et al. | 277/25 |
| 2,494,971 | 1/1950 | Summers | 277/25 |
| 2,665,929 | 1/1954 | Sawyer | 277/25 |
| 2,823,052 | 2/1958 | Collman | 277/15 |
| 3,563,558 | 2/1971 | Doutt | 277/205 |
| 4,076,260 | 2/1978 | Legoy et al. | 277/25 |

Primary Examiner—Robert I. Smith
Attorney, Agent, or Firm—Scully, Scott, Murphy & Presser

[57] ABSTRACT

A sealing device for a hydraulic fluid rotating machine, characterized in that between a free internal peripheral edge (126) of a rotating body (20) and a contiguous wall of sleeve (18a, 18b) around which it fits, there is mounted a fixed fluid-tight seal (120), integral with sleeve (18a, 18b), but axially movable in relation to the latter, said seal comprising an annular body (122) which fits with some play around the sleeve, a lip seal (123) turned on the side of cavity (52) of turning body (20) and being applied in a fluid-tight sealing manner on the exterior surface of the machine, and an annular radial protrusion (124) housed inside an annular groove (126) formed in the peripheral edge (116) of the rotating body, the dimensions of which are greater than those of the protrusion, thereby avoiding any friction of the protrusion with the rotating body.

17 Claims, 7 Drawing Figures

SEALING DEVICE FOR ROTARY HYDRAULIC FLUID MACHINE

BACKGROUND OF THE INVENTION

The present addition relates to improvements in the sealing device disclosed by U.S. Pat. No. 4,076,260. A sealing device of this nature is mounted on a rotating machine, such as a centrifugal pump, compressor or steam turbine of the type comprising a housing and a shaft emerging from the housing at at least one point. The sealing device comprises both a fixed sleeve, coaxial with the end of the shaft to be sealed, integral with the housing and housed inside a cavity formed at the end of the housing and housed inside a cavity formed at the end of the housing through which the shaft emerges, and a hollow rotating body. The hollow rotating body is defined by a member having an annular cross section fitted around the end of the shaft spaced from the fixed sleeve, and a substantially flat annular member joined thereto at its external edge, and the internal edge of which is loosely fitted around a portion of the sleeve which extends beyond the housing. The sleeve has an inside diameter greater than the diameter of the shaft, defining therefore with the latter a fluid-tight annular chamber which is limited on the machine side by an annular lip seal carried by the sleeve and normally being in fluid-tight contact about the shaft. The annular chamber connects with the cavity of the rotating body through a diaphragm tightly fitted to the shaft and across a path including a high pressure drop, formed between the sleeve and the walls of the hollow-body. The chamber is supplied with hydraulic fluid at a predetermined pressure which forms a liquid-tight sleeve in the fluid-tight annular chamber, and gives rise to a leakage rate towards the cavity of the hollow body across the path having a high pressure drop. The leakage fluid is projected by centrifugal force against the exterior peripheral wall of the hollow rotating body where it forms a liquid ring, the thickness of which is kept constant and less than the width of the annular flat member of the rotating body by means of a Pitot tube attached to the fixed sleeve. The Pitot tube comprises an arched shaped tubular body terminating at one end in a collecting orifice submerged in the liquid ring which faces the direction of rotation of the latter and terminating at the other end in the annular chamber.

Any excess liquid of the liquid ring is reintroduced into the fluid-tight annular chamber, which always remains filled with liquid, thus assuring sealing of the machine. The different elements of the sealing device are designed and dimensioned such that during operation, the pressure in the annular chamber is sufficient to lift the annular lip seal from the shaft. Therefore, during operation while the machine is rotating, sealing is assured by the liquid contained in the chamber, and in a neutral or nonrotating state, sealing is assured by the annular lip seal.

Such an annular lip seal functions satisfactorily in the case of a machine or pump containing a hydraulic fluid which is relatively neutral, cold or at a moderate temperature and pressure. But with a gas or an active liquid, for example, a corrosive, harmful liquid, or a liquid at a high temperature and pressure, the fluid-tight seal provided in the neutral or nonrotating state by such an annular seal is clearly inadequate. Such is the case, for example, with nuclear energy applications or with the treatment of dangerous chemical products, for which the fluid-tight seal must be absolutely perfect both in operation and in a state of rest.

SUMMARY OF THE INVENTION

A first and primary object of the present invention is therefore to provide a solution to the sealing problems of rotating machines containing such liquids.

It is recalled that the sealing fluid used in the sealing device of the principal U.S. Pat. No. 4,076,260 is of the very same liquid contained in the machine or pump. In the case of a centrifugal pump, the liquid is drawn from the delivery side of the pump, and is introduced into the annular chamber by means of a conduct having a valve for control of the flow rate. It is understood that, in the case of liquids carrying or loaded with suspended particles, the latter quickly end up clogging the fluid-tight annular chamber and the cavity of the rotating body and also obstructing the Pitot tube.

A second object of the present addition is to remedy this drawback of rotating machines containing liquids carrying many suspended particles.

Finally, it is recalled that pursuant to another embodiment of the principal patent's sealing device, applicable in the case where the pump's suction pressure is negative, the annular seal is eliminated since it would be lifted even at rest, allowing the liquid of the sealing device to reach the pump's suction again. In place of the annular seal, the sleeve carries a second diaphragm with a diameter slightly greater than that of the shaft so as to restrict the passage between the annular chamber and the suction. The sealing liquid is introduced directly into the cavity of the rotating body through a channel formed in the sleeve, and by means of a nozzle the orifice of which is closed by a spring strip the free end of which is in the path of the liquid ring in the rotating body and is oriented in the direction of movement of the liquid ring, so that under the effect of the liquid ring's pressure, it controls the liquid injected by the nozzle. In this arrangement, the opening of the nozzle is adjusted in order that the thickness of the liquid ring remains constant. Any increase in this thickness effects the equilibrium of the spring strip to re-establish the equilibrium when the Pitot tube, which is designed with a flow rate greater than the leakage rates of flow through the two diaphragms, has forced the excess liquid back into the annular chamber. An elastic lip seal is mounted on the inside edge of the flat annular member of the rotating body, and upon stopping of the pump, it tightens about the sleeve to prevent the entrance of air into the pump.

A third object of the present addition is to simplify the structure of a sealing device of this nature while making it more effective.

A fourth object of the subject invention is to provide a means for reducing hydraulic shocks, such as water-hammering, exerted on pumps, particularly during start up.

The present invention has therefore for its object to remedy the abovementioned drawbacks of the principal patent's sealing device, and proposes to achieve this with a very highly efficient sealing device, which can be very simply fitted to hydraulic fluid or gas rotating machines.

According to one improvement of the present invention, the sealing device is characterized in that between the internal free peripheral edge of the rotating body and the contiguous wall of the sleeve around which it is fitted, there is mounted a fixed fluid-tight seal integral with the sleeve, but axially moveable in relation to the latter. The joint comprises an annular body which is fitted with a small amount of play around the sleeve, a sealing lip on the side of the cavity towards the turning body and capable of being applied to form a fluid-tight seal relative to the outer surface of the sleeve, and an annular radial projection housed inside an annular groove formed in the peripheral edge of the rotating body, the dimensions of which are greater than those of the projection, to avoid any friction between the projection and the rotating body.

Thus during stoppage, the fluid-tight seal is axially forced back and applied against the lateral wall of the groove, under the action of the pressure exerted by the fluid contained in the rotating body, assuring the radial fluid-seal of the device, while the sealing lip assures an axial fluid-seal at the level of the sleeve.

The fluid-tight seal is prevented from turning, but allowed to move axially along the sleeve by means of a stop integral with the sleeve or housing which protrudes into an axial slot on the annular body of the seal.

Advantageously, the free peripheral edge of the rotating body is formed, on both sides of the groove, in the shape of a truncated conical wall having the same axis as the shaft and which separates from the shaft as it penetrates into the cavity of the turning body. In this manner, in the event of leakage through the seal, the liquid under the action of centrifugal force, truncated conical wall towards the interior of the turning body and is reintroduced into the liquid ring.

According to another improvement of subject invention, the internal walls of the cup shaped member and the flat annular member of the rotating body, are provided with radial and axial small blades to provide better driving of the liquid ring. Experience has shown that these small blades result in considerable improvement of the performance of the Pitot tube and consequently improvement in the effectiveness of the liquid sleeve.

It is not critical, according to the invention, whether the cup shaped member of the rotating body is the one which is sealed and fixed on the shaft or the flat annular member is the one which faces the sleeve, or that the opposite be provided. In either event, the two members are joined together by means of a circlip.

In order to facilitate the manufacture and mounting of the sealing device, the sleeve is formed of two members, namely a first member coaxially mounted around the shaft, in the orifice of the housing through which the shaft projects, and a second member, joined together with the first, for example, by threaded engagement, which protrudes inside the cavity of the rotating body and supports the Pitot tube.

According to another improvement of the subject invention, the sleeve has an internal diameter clearly greater than that of the shaft, such that the annular chamber defined between the sleeve and shaft receive a floating ring for absorbing hydraulic shocks exerted on the machine. The ring has an internal diameter greater than that of the shaft and is provided with diaphragms at its ends allowing a little play with the shaft so as to allow free rotation while limiting the leakage of the sealing liquid towards the machine and also towards the rotating body. This floating ring is not moveable in rotation and axial translation in relation to the sleeve, but is moveable radially.

To achieve this effect, the floating ring rests at its ends against two radial faces formed on the sleeve, provided with a fluid-tight seal, and a stop integral with one of the radial faces protrudes inside a slot formed at the adjacent end of the floating ring and having an oversized radial height such that the ring is free to move radially.

In the annular chamber formed between the sleeve and the floating ring, there is provided both a channel formed in the sleeve or housing and connected to external source of sealing liquid and the outlet of the Pitot tube. Furthermore, the annular passage formed between the floating ring and shaft connects, respectively, through two diaphragms to the machine and the cavity of the rotating body.

The sealing liquid can be drawn from the pressure side of the pump, as in the principal patent. Also, according to the present invention, a sealing liquid can be supplied by an independent liquid source, by means of a pressure regulator, the regulator of which takes into consideration the characterisitics of the sealing device.

The use of an independent sealing liquid is especially advantageous in the case where the liquid of the machine is loaded with particles suspended therein.

In the case where the pressure at the collecting orifice of the Pitot tube is greater than the pressure on the machine side, at least one hole is provided in the floating ring which connects the chamber formed between the shaft and floating ring and the chamber formed between the latter and the sleeve. Because this second chamber is sensitive to the pressure existing at the collecting orifice of the Pitot tube, the rate of leakage is correctly maintained from the second chamber towards the machine, and not in the opposite direction.

On the contrary, in the case where the pressure is lower than the pressure on the machine side, the floating ring does not have any hole, for if it had, the pressure on the machine side would be exerted through the diaphragm and the hole to the Pitot tube, which would be obstructed. Moreover, the rotating body would be filled with liquid and the fluid-tight seal would be loaded and would leak. The excess of sealing liquid scooped out by the Pitot tube on the liquid ring is forced back from the fluid-tight annular chamber towards an outside capacity.

BRIEF DESCRIPTION OF THE DRAWINGS

The invention will be better understood after reading the detailed description which follows, of several embodiments of the invention, given as exemplary embodiments, concerning the attached drawings, in which.

DESCRIPTION OF THE PREFERRED EMBODIMENTS

In the description which follows, it is assumed that the machine upon which the sealing device is mounted is a centrifugal pump, but it is evident that the subject invention can be applied to any rotating machine containing any type of liquid whatsoever, pure or loaded with suspended particles, viscous or fluid, harmful or inoffensive, cold or very high temperature and high pressure. The pump is neither described nor illustrated herein, and the analogous elements of the sealing device of the present invention and that of the aforesaid patent are designated by the same reference numerals.

Figure 1:
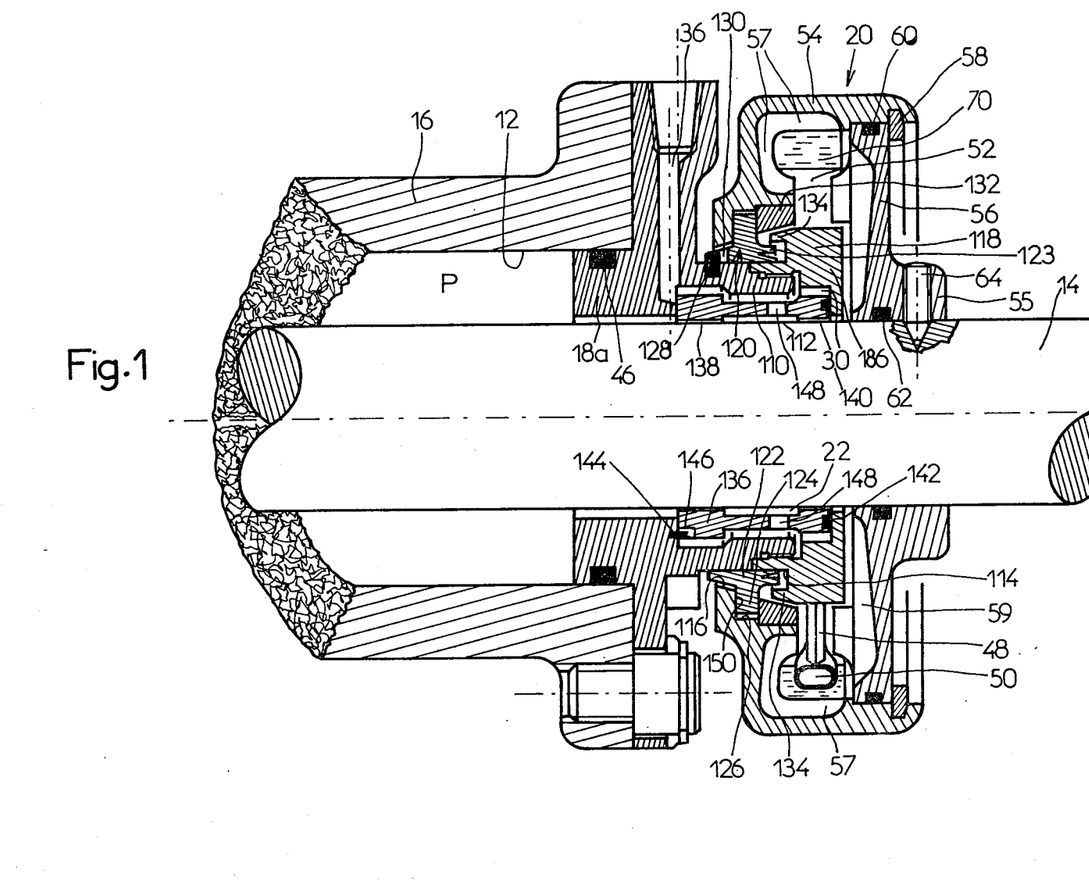
FIGS. 1 to 3 are partial views in axial section of three different embodiments of sealing devices according to the present invention.

In the embodiments of FIG. 1, an annular sleeve is comprised of two members, namely a first member 18a coaxially mounted around shaft 14 of the pump, and having mounted thereon a fluid-tight seal 46, positioned inside an orifice 12 through which the shaft emerges from the housing 16, and a second member 18b protruding inside cavity 52 of rotating body 20, which is joined together with member 18a through the threaded engagement of two tubular portions 110, 112 of the two members at which they form a continuous cylindrical exterior surface 114.

Rotating body 20 comprises, as in the aforesaid patent, a cup shaped (in section) member 54 and a substantially flat annular member 56 having a hub 55. The latter is joined around shaft 14 and fixed thereto by means of a screw 64 or other equivalent means, with a toric seal 62 therebetween to provide a seal. The member 54 is joined together with member 56 at its outer edge by means of a circlip 58 and an associated seal 60. Internal peripheral edge 116 of the member 54 abits against a continuous surface 114, and a radial annular flange 118 protrudes from member 18b towards the interior of cavity 52.

It is evident that the positions of members 54 and 56 can be inverted in which the cup shaped member would be fixed to shaft 14 and the flat member would be placed against surface 114 of sleeve 18a, 18b. In order to improve the driving of the liquid ring which is formed in the outer periphery of cavity 52, cup-shaped member 54 includes axial and radial small blades 57, and flat member 56 includes small radial blades 59.

A non-turning fluid-tight seal 120 is mounted between the internal peripheral edge 116 of member 54 (or of member 56 in the abovementioned design variation) and surface 114. The seal 120 comprises an annular body 122 which fits with a little play around surface 114, and a radial annular projection 124 is seated inside an annular groove 126 formed on peripheral edge 116 of cup-shaped member 54. A little play is provided between the walls of projection 124 and those of groove 126 to avoid any friction during rotation of the rotating body. Annular body 122 includes a lip seal 123 which assures a fluid-tight seal with sleeve 18a, 18b. The seal 120 can therefore move axially upon the sleeve. On the other hand, it is joined together in rotation with the latter by a stop 128 protruding inside an axial slot 130 formed in the body 120 of the seal. Its mounting is facilitated by the fact that one of the radial walls of groove 126 is formed by a ring 132 which is fixed to cup-shaped member 54 after the seal is placed in position.

As has already been explained, to reduce leaks through seal 120, the peripheral edge 116 member 54 is shaped as a truncated conical surface with the same axis as shaft 14 and inclining towards the shaft as it proceeds away from cavity 52 of rotating body 20. Furthermore, the lips of seal 120 project toward the side of cavity 52 and overlap with an annular stop 134 protruding from member 18b to form a tortuous path with a high pressure drop thereacross.

Member 18b supports Pitot tube 48. The collecting orifice 50 of the latter is located in cavity 52 of rotating body 20, in the vicinity of the outer periphery of the cavity, and its opposite outlet is positioned in the annular chamber 30 formed between members 18a, 18b and shaft 14.

A floating ring 136 is mounted in annular chamber 30, and has an internal diameter greater than the diameter of shaft 14 and an external diameter less than the internal diameter of members 18a, 18b. The floating ring is provided with diaphragms 138,140 at its ends to provide a small amount of play relative to shaft 14. Shaft 14 can therefore turn freely, while leaks of the sealed liquid towards rotating body 20 and also towards the pump are limited. The floating ring also presents a degree of radial freedom, which allows it to absorb any hydraulic shocks encountered by the sealing device. On the other hand, it is motionless in rotation and in axial translation, in that it fits between two radial walls of the members 18a and 18b, which are separated by a distance slightly greater than the length of the ring. A toric seal 142 provides a fluid-tight seal as well as the taking up of play. A stop 144, integral with one of the members 18a or 18b, protrudes into a slot 146 formed at the adjacent end of the ring. The radial height of the slot is sufficiently large that the ring can move radially without being hampered by the stop 144.

Annular chamber 30 connects with the tubular passage 22 defined between shaft 14 and the floating ring 136 through several holes 148 formed in the latter. Tubular passage 22 connects through diaphragms 138 and 140 to the suction side of the pump and cavity 52.

Chamber 30 also connects to channel 36, through which the sealing liquid is fed. This liquid can be the same liquid as the pump, drawn from the pressure side. However, in the cases where this liquid is thick, it is preferable to use an independent liquid which is not thick, supplied by a liquid source, through a pressure regulator.

The sealing device of FIG. 1 operates in the following manner.

When the pump is at rest, rotating body 20 is filled with sealing liquid under pressure, which prevents any entry of air into the pump. By reason of the difference in pressure exerted between its two sides, the fluid-tight seal is forced towards the left in FIG. 1 and abuts against radial wall 150 of groove 126, thereby assuring a fluid tight seal. As soon as the pump begins to rotate, the sealing liquid, under the action of centrifugal force, is carried to the external periphery of cavity 52, where it forms a liquid ring 70. The pressure in the cavity becomes substantially equal to atmospheric pressure, and the fluid-tight seal lifts off wall 150 and comes to occupy a position in which it does not rub against any of the walls of groove 126, so that the rotational motion of shaft 14 and rotating body 20 is not impeded.

The pressure regulator is adjusted to maintain passage 22 at a pressure greater than a pressure P in force on the suction side of the pump.

Two cases are to be considered in the operation of the sealing device. 1. The pressure at collecting orifice 50 of the Pitot tube is greater than the pressure P. The sealing liquid flowing into annular chamber 30, reaches annular passage 22 through holes 148, and gives rise to low leakage raes through diaphragms 138, 140 towards the pump and towards rotating body 20. Leakage flows towards the rotating body is directed to the periphery of the cavity and serves to enlarge the liquid ring 70. When collecting orifice 50 of the Pitot tube is completely submerged, the latter serves to establish an equilibium between the pressure existing in annular chamber 30 and the pressure resulting from the centrifugal force of liquid ring 70. Once this equilibrium is reached, any increase in the thickness of liquid ring 70 unbalances the equilibrium and the volume of liquid corresponding to this increase is transferred by Pitot tube 48 towards chamber 30, from where it flows towards the machine, through holes 148 and diaphragm 138.

Thus, the liquid contained in tubular passage 22 constitutes a true fluid-tight seal preventing any leakage from the pump to the outside. The sealing liquid which is heated by reason of its rotation is cooled by its contact with the fresh liquid contained in Chamber 30. 2. The pressure at collecting orifice 50 is lower than the pressure P. In this case, floating ring 136 must not reach holes 148. If it did, pressure P would be communicated through diaphragm 138 and holes 148 to chamber 30 and then to the outlet of the Pitot tube, which would become obstructed. On the other hand, if holes 148 are closed chamber 30 is not under a positive pressure, and the Pitot tube can therefore function normally. The excess of liquid coming into chamber 30 is forced back towards an exterior capacity which is not shown.

The sealing device which has just been described and that of the principal patent can be mounted upon any newly built hydraulic fluid rotating machine as well as upon already-existing rotating machines which generally use a standard sealing means such as a stuffing box. Member 18a of the sleeve will, for example, be inserted into the packing box.

Figure 2:
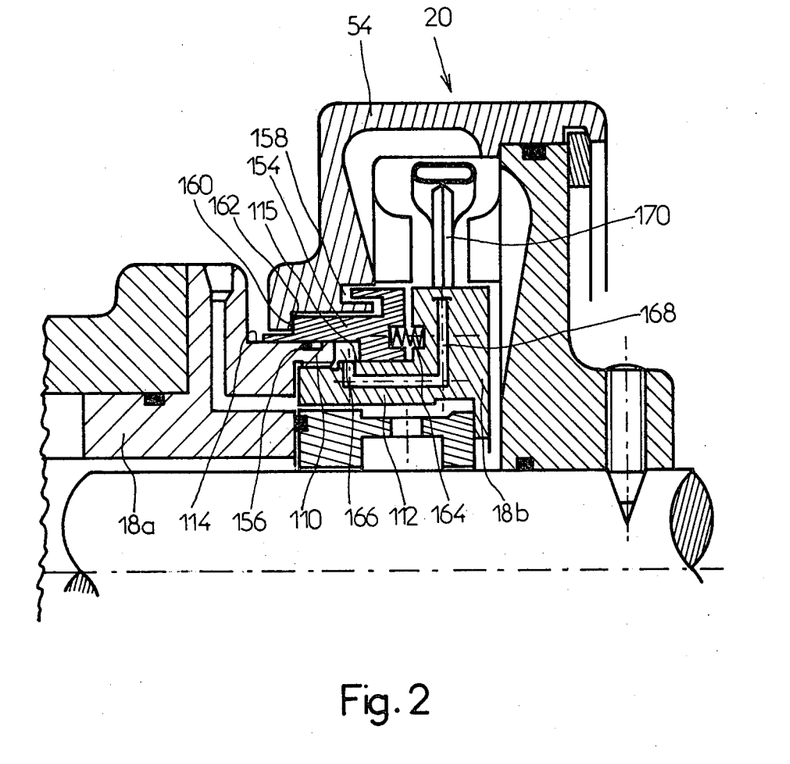

The sealing device illustrated in FIG. 2 is particularly designed for applications where a fluid-tight seal needs to be assured with high reliability when the rotating body 20 is at rest.

Only the new elements of the sealing device will be described hereafter in detail. As before, the tubular sleeve is constructed in two members 18a and 18b, ending in tubular portions 110,112 by which they are joined together, through threaded engagement therebetween. Tubular portion 112 has an external diameter less than that of tubular portion 110. In the space formed between the internal peripheral edge of cup-shaped member 54 and the stepped external surfaces 114 and 115 of tubular portions 110 and 112, there is mounted an axially slideable annular piston valve 154 in place of the fluid-tight seal 120 in the embodiment of FIG. 1. Piston valve 154 presents two internal cylindrical walls with diameters respectively equal to the external diameters of tubular portions 110,112, with an O-ring 156 assuring a fluid-tight seal between the walls in contact. Exterior wall of piston valve 154 has an indented profile which overlaps with a certain amount of play with a complementary profile formed on the internal peripheral edge of cup-shaped member 56, so as to define a narrow zigzag or tortuous passage 158 with a substantial pressure drop thereacross which is designed to limit leakage. More particularly, the piston valve has, on its exterior wall an annular surface 160 located in a radial plane, and the peripheral edge of member 54 comprises an annular seal 162 also located in a radial plane with respect to surface 160 which can possibly be metallized. Springs 164 or other equivalent means are supported by member 18b and on piston valve 154, and urge the latter member towards the right in FIG. 2. The piston valve defines with tubular portions 110 and 112, a chamber 166 into which extend a channel 168 connected to a second Pitot tube 170 having the same shape and characteristics as Pitot tube 48, not shown in FIG. 2.

During rotation, the second Pitot tube 170 supplies fluid under pressure to chamber, 166, which causes an axial movement of piston valve 154 by several tenths of millimeters, against the force of springs 164, thereby lifting the piston valve from its seat 162 to eliminate any friction between the fixed members and the rotating members.

At a stopped or rest position, chamber 166 is no longer under pressure, so that springs 164 draw back piston valve 154 towards its initial position, putting face 160 into contact with its seat 162. The pump is thereby completely isolated from the outside.

For the remainder, the sealing device functions in substantially the same manner as the embodiment of FIG. 1.

Figure 3:
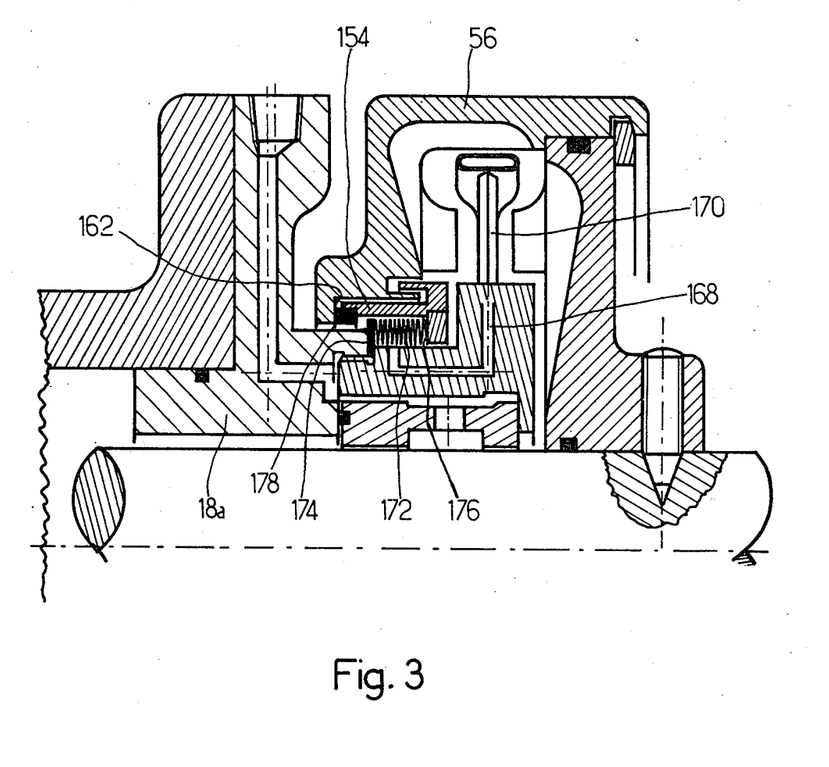

The embodiment of FIG. 3 differs from that of FIG. 2 by the fact that the annular piston valve 154 is hollow in its internal periphery, and receives in the recess thus formed an annular extensible compartment 172 or an equivalent device, having its ends defined by a radial face 174 of member 18a of the tubular sleeve and by a radial face 176 of piston valve 154. Channel 168 is connected to the second Pitot tube 170 and extends to the inside of the extensible compartment 172. Atmospheric pressure is exerted on the exterior wall of the extensible compartment.

During rotation, the second Pitot tube 170 supplies fluid under pressure to the interior chamber of extensible compartmnt 172, which causes the extension of the latter and thereby a movement of piston valve 154 towards the right in FIG. 3 and the consequent lifting of seal 178 from its seat 162 on cup-shaped member 54, to thereby eliminate any friction therebetween.

At a rest or stopped position, the interior chamber of the extensible compartment 172 is no longer under pressure, so that the latter retracts, bringing piston valve 154 back to its initial position, with the seal 178 seated against its seat 162.

Figure 4A:
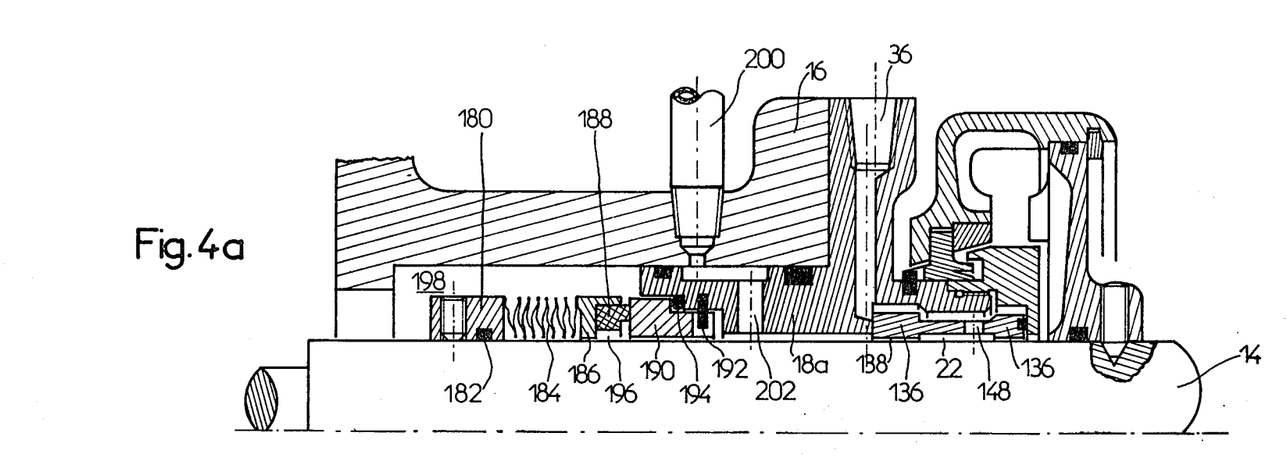
FIGS. 4a and 4b show two possible combinations of the sealing device of FIG. 1 with a mechanical gear.
Figure 4B:
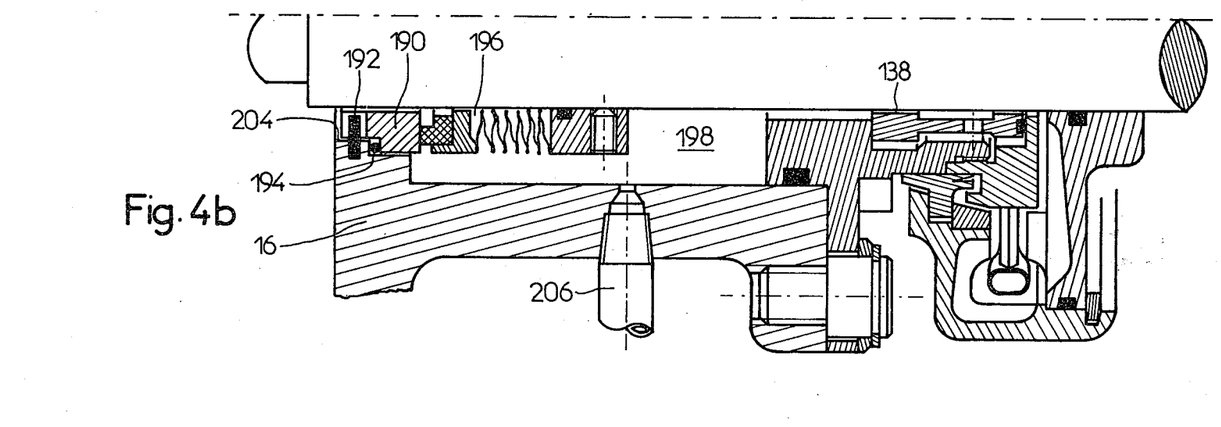

FIGS. 4a and 4b illustrate two possible combinations of the sealing device of FIG. 1 with a mechanical gear.

A combination of such a fluid-tight liquid seal and a mechanical gear makes it possible to obtain seals which are very difficult to obtain otherwise, especially in the case of liquids which are thick, toxic, harmful, irradiated, gaseous, etc.

The sealing device with a liquid seal will not be described hereafter since it is identical to that in FIG. 1, and only the mechanical gear will be described. Moreover, it should be noted that this mentioned gear can also be mounted in combination with the sealing devices pursuant to either of FIGS. 2 and 3.

The mechanical gear in FIGS. 4a and 4b completely isolates the liquid seal sealing device, which functions therefore in an autonomous manner with a neutral sealing fluid.

Referring to FIG. 4a, the mechanical gear comprises in the first instance a first ring 180, fixed around shaft 14 on the rotating machine side by means of a screw, with an O-ring 182 assuring a fluid-tight seal and an extensible compartment 184 surrounding shaft 14, the ends of which are defined by a first round 180 and a second ring 186 having a little play with respect to the shaft and bearing a lateral annular seal 188 without contact with the shaft, and in the second instance, a third ring 190 having a little play with respect to the shaft and joined together with fixed sleeve member 18a by a stop 192 which allows slight axial movements of ring 190 relative to member 18a. An O-ring 194 assures a fluid-tight seal between ring 190 and member 18a during axial movements of the ring.

Thus, the assembly of ring 180, extensible compartment 184, ring 186, and lateral seal 188 is integral with the shaft and turns therewith, whereas the ring 190 is fixed. The lateral seal 188 is maintained in rubbing contact with ring 190 by extensible compartment 184 without ever lifting therefrom. As a consequence of this, the interior space 196 with the mechanical gear is connected to tubular passage 22 of the sealing device, but is completely isolated from the exterior space 198 which contacts with the hydraulic machine. The sealing liquid feeds into the interior space 196 through holes 148 and diaphragm 138 of floating ring 136, and the sealing liquid is carried back to the liquid source by a pipe 200 connected to a channel 202 formed in housing 16 and in member 18a. It should also be evident that the sealing liquid can be introduced through pipe 200 and discharged through channel 36.

Therefore, the gear assures a fluid-tight seal of shaft section 14, comprised of ring 180 and floating ring 136 of the sealing device.

Figure 5:
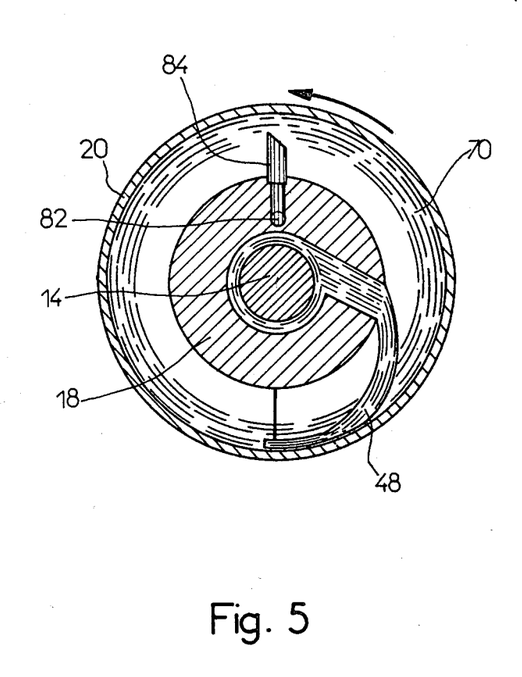
FIG. 5 shows a view in radial section of one design variation of the sealing device of FIG. 7b in the principal patent; and, FIG. 6 is a view in axial section of the sealing device according to the invention, applied in the case of a fluid-tight machine with a gaseous fluid such as a compressor or a steam turbine.

In the variation of construction of FIG. 4b, the sealing device comprises the same elements as before, but arranged so that interior space 196 of the gear is in communication with the machine and the exterior space 198 is coupled to the sealing device. In order to achieve this, ring 190 is fixed by means of a step in opening 204 of the housing, with a seal 194 assuring a fluid-tight seal at the level of the opening, whereas ring 180 is fixed in a fluid-tight seal on the shaft of the sealing device side. Sealing liquid is introduced into space 198, through diaphragm 138, and is brought back to the source by a pipe 206. FIG. 5 shows one construction variation of the device in FIG. 7b of the principle patent, and is different therefrom in that the plate or strip spring has been eliminated, and nozzle 84 which extends into the cavity of the rotating body, feeds the liquid ring 70 directly. To accomplish this, valve 44 need only be replaced (see FIG. 2a in the principal patent) by a pressure regulator or reducing valve connected to channel 82.

The orifice of nozzle 84 is simultaneously acted upon by the counter actions of the pressure of the liquid ring and also functions as a second Pitot tube, since an increase in the thickness of the liquid ring makes the pressure in channel 82 rise, which acts upon the pressure regulator or reducing valve, which steps in to automatically adjust the equalizing delivery to maintain the thickness of the liquid ring constant.

Figure 6:
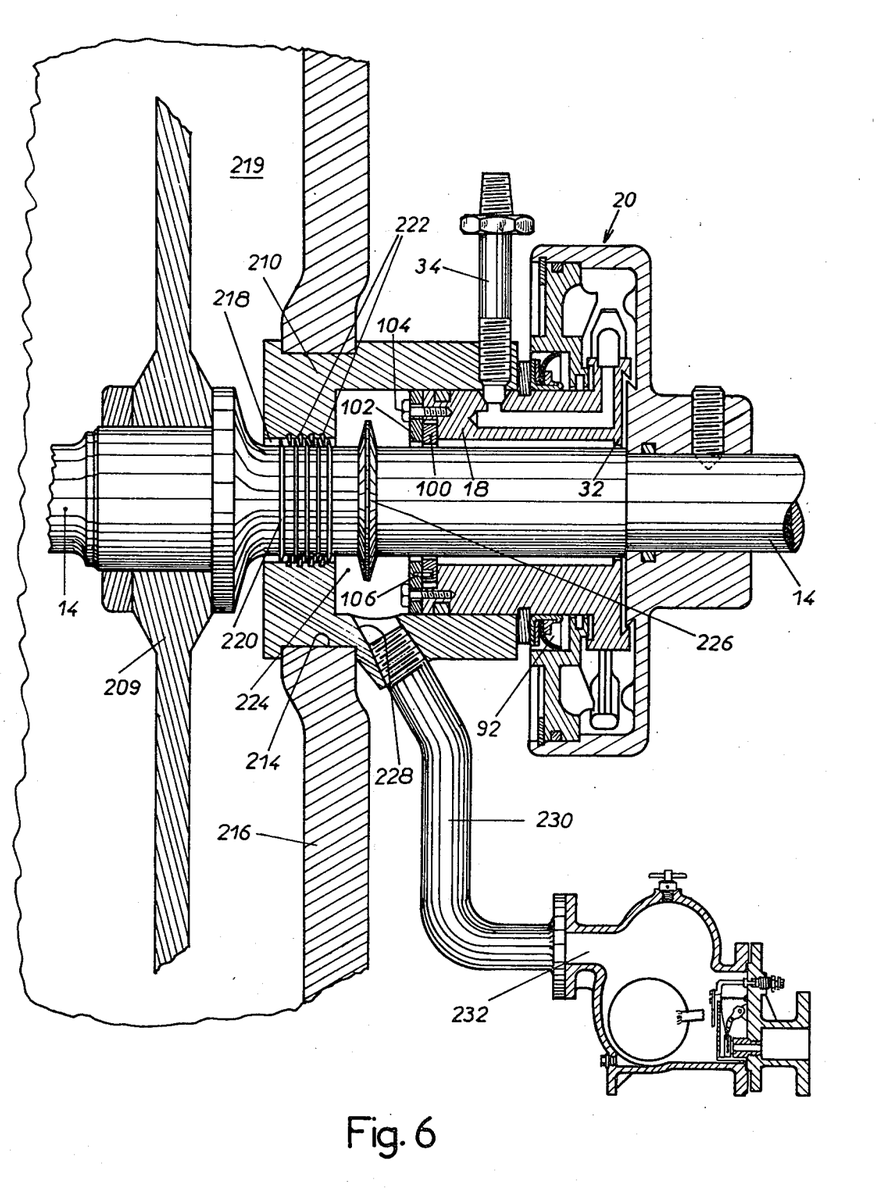

With reference to FIG. 6, one application of the sealing device according to the present invention is to steam or gas rotating machines, such as compressors or steam turbines, as will be described.

The sealing device shown in FIG. 6 is the one illustrated in FIG. 26 of the principal patent, except that the diaphragm 80 is replaced by a floating ring 100 having an internal diameter slightly greater than the diameter of shaft 14 and the lip seal 92 has a different shape than that in FIG. 2b of the principal patent.

The floating ring is restricted from axial movements by a flange 102 screwed on sleeve 18 by screws 104. A step 106 prevents the floating ring from turning. For the remainder of the description of the sealing device. reference should be had to the principal patent. It is evident that the sealing device could be replaced by any one of those of the principal patent or of the present application.

The sealing device is described in the case where it is fitted to a steam turbine, but it should be evident that the description is also applicable to a compressor. Likewise, description is made to the case of fitting the sealing device to already-existing machines equipped with a standard sealing means, but it should be evident that the sealing devices according to the principal patent or the present application can be fitted to rotating steam machines built specially to receive them.

The sealing device is fixed on the compressor or the turbine in an engaging sleeve 18 in a fluid-tight box 210. To achieve this, two thirds of the standard labyrinth fluid-tight seals or carbon rings are left out. Rotating body 20 is fixed on shaft 14 of the compressor or turbine, and rotor 200 of the turbine is set on shaft 14.

Fluid tight box 210 is closed by a seat recessed into an opening 214 of housing 216. This seat has an orifice 218 through which the shaft 14 of the turbine extends with a limited amount of play. Baffles 220, 222 formed on the shaft and on the wall of orifice 218 define a zigzag or tortuous path designed to limit steam leakage from interior space 219 of housing 216 to a fluid receiving chamber 224 defined between the end of sleeve 18, shaft 14 and fluid-tight box 210 and preventing the introduction of liquid inside the housing.

The shaft portion inside receiving chamber 224 supports a deflector 226 for ejecting the leakage flow through floating ring 100 towards the periphery of receiving chamber 224. At the lowest part of the latter, an opening 228 is provided, into which extends a channel 230 connected to drain cock 232, for example, of the ball-cock type, with a continuous and progressive flow.

The sealing device is fed by water, which can be supplied by an independent fluid circuit or can be drawn from the cooling system of the bearings, and is not shown. Furthermore, it is possible to draw a portion of this water from drain cock 232. In the case of compressors, the sealing device is fed with oil.

In operation, the pressurized steam originating from inside housing 216 has a leakage flow through maze 220, 222 to a receiving chamber 234. The operation of this sealing device has already been described in the principal patent. The leakage of water through floating ring 100 is ejected by deflector 226 on the periphery of chamber 224. The water is next collected by tube 230 and recovered by drain cock 232.

Because the pressure inside receiving chamber 224 is identical to that existing inside housing 216, the water contained inside chamber 224 does not return inside interior space 219, which allows a constant steam leakage flow through the labyrinth, since the steam condenses upon contact with the water in chamber 224.

The drain cock, causes the water to be discharged as it's being formed. Consequently, in operation, there exists no risk of water seeping inside the housing. In view thereof, saturated vapor is contained in receiving chamber 224, in channel 230, and in a part of drain cock 232. Water discharged by the drain cock can be recovered by adequate circuits.

One of the advantages of the sealing device which has been described is that it is possible to save distilled water and steam, and to effectively protect the bearings, from water because, as is known, a weak feature of these machines resides in the fact that water can seep into the bearings.

The sealing device is maintained under pressure in a rest or stopped state because of the fluid-tight seal 92. As is known, in stopping, steam turbines are always reheating, which does not now pose any sealing problems, provided that the sealing device is also permanently supplied with fluid. This condition can be attained since the water which is used for cooling of the turbine can also be supplied by a feeder system.

What is claimed is:

1. Sealing device for a rotary hydraulic machine containing hydraulic fluid comprising a casing, a shaft emerging from said casing and an annular gasket/valve provided with a flexible lip, whereof one side is turned towards the suction side of a pump and which presses normally with sealed contact around the shaft when the pump is inoperative, and wherein an annular sealing chamber is defined between the shaft and a casing part, said sealing chamber being connected, on the one hand, to the side of the gasket lip opposite the first said side and, on the other hand, to an annular cavity defined inside a hollow rotary body fixed in a sealed manner around the end of the shaft to be sealed and fitting with clearance around the casing, valve means being provided for connecting the delivery side of the pump to said sealing chamber when the pump rotates at normal speed in order that said sealing chamber is permanently filled with liquid at a pressure equal to that of the delivery pressure, such tht the gasket/valve is separated from the shaft and that a leakage flow is delivered to said cavity of the rotary body where it forms a liquid ring pressed under the effect of the centrifugal force against the outer periphery of said cavity, recovery means being provided for keeping the depth of said liquid ring constant and for restoring the excess liquid to said sealing chamber as well as for maintaining said sealing chamber at a pressure greater than that of the suction pressure of the pump, said sealing devices being characterized in that between a free internal peripheral edge of the rotating body and the contiguous sleeve wall, but movable axially in relation to the latter, said seal comprises an annular body which fits with some play around the sleeve, a lip seal turned on the side of cavity of rotating body and capable of being applied in a fluid-tight manner upon the exterior surface of the sleeve, and a radial annular protrusion housed inside an annular formed in said peripheral edge of the rotating body, the dimensions of which are greater than those of said protrusion, so as to avoid any friction of the protrusion with the rotating body during rotation.

2. Sealing device according to claim 1, characterized in that the fluid-tight seal is prevented from rotating, but is allowed to move axially along the sleeve, by means of a stop integral with sleeve or with housing and protruding into an axial seat provided on the annular body of the seal.

3. Sealing device according to claim 1 or 2, characterized in that the sleeve presents an internal diameter greater than that of shaft, with an annular chamber being defined between sleeve and shaft and receiving a floating ring for absorbing hydraulic shocks exerted on the machine, said ring having an internal diameter greater than that of the shaft and being provided with diaphragms at its ends having some play with the shaft so as to allow its free rotation while limiting the leakage of sealing liquid towards the machine and rotating body, said floating ring being restricted against rotation and axial translation with relation to the sleeve, but being movable radially.

4. Sealing device according to claim 3, characterized in that said floating ring rests at its ends against two radial faces formed on the sleeve, with a fluid-tight seal, a step integral with one of said radial faces protruding inside a slot formed at the adjacent end of the floating ring and with an oversized radial height such that the ring is free to move radially.

5. Sealing device according to claim 4, characterized in that in said annular chamber formed between sleeve and floating ring there extends, first, a channel formed in the sleeve or housing and connected to an outside sealing liquid source, and secondly, the outlet of Pitot tube.

6. Sealing device according to claim 5, characterized in that said annular passage formed between floating ring and the shaft connects, respectively, through two diaphragms, to the machine and to the cavity of the rotating body.

7. Sealing device according to claim 6, applicable where the pressure at the collecting orifice of the Pitot tube is greater than the pressure on the machine side, characterized in that said floating ring has at least one hole for connection between the chamber formed between shaft and floating ring and the chamber formed between the latter and the sleeve.

8. Sealing device according to claim 6, applicable in the case where the pressure at the collecting orifice of the Pitot tube is lower than the pressure on the machine side, characterized in that said floating ring does not include a hole, such that the outlet of the Pitot tube is isolated from the pressure on the machine side, with the excess sealing liquid scooped out by Pitot tube from the liquid ring being discharged from fluid-tight chamber to an exterior capacity.

9. Sealing device according to claim 1, characterized in combination with a mechanical gear, capable of completely isolating a section of shaft located between said housing and the sealing device in relation to the fluid of the machine.

10. Sealing device according to claim 9, characterized in that said mechanical gear comprises a first ring fixed in a fluid-tight manner around said shaft, a second ring having some play with the shaft and bearing a lateral annular seal, an annular extensible compartment surrounding the shaft and fixed in a fluid-tight manner by its ends on the first and second rings, and a third ring having some play with the shaft and fixed in a fluid-tight manner or sleeve so that the lateral seal is permanently in frictional contact with the third ring, and the fluid-tight which fills space inside the gear being introduced diaphragm of floating ring and being discharged towards an exterior capacity by a channel formed through the sleeve, or vice versa.

11. Sealing device according to claim 9 or 10 characterized in that said third ring is fixed with a fluid-tight seal in an opening connecting to the inside of housing of the machine while having some play with shaft, the sealing liquid which fills space outside said gear being introduced through diaphragm of floating ring and being discharged towards an exterior capacity by pipe extending to said exterior capacity.

12. Sealing device according to claim 1, characterized in that said free peripheral edge of the rotating body is shaped on both sides of groove with a truncated conical wall which is coaxial with shaft and which moves away from the shaft as it extends into the cavity of the rotating body.

13. Sealing device according to claim 1, characterized in that the internal walls of the cup-shaped member and the flat annular member of the rotating body are provided with small radial blades and axial blades facilitating a more effective driving of the liquid ring.

14. Sealing device according to claim 1, characterized in that flat annular member of said rotating body comprises a hub by which it is fixed to shaft, and in that said internal peripheral edge (116) of cup-shaped member surrounds, with some play said sleeve, said members being joined to each other at their external periphery by a circlip means.

15. Sealing device according to claim 1, characterized in that said sleeve is constructed with two members, a first member coaxially mounted around shaft, in the opening of housing through which the shaft emerges, and a second member joined together with the first, which protrudes inside cavity of the rotating body and bears Pitot tube.

16. Sealing device according to claim 1, characterized in that the sealing liquid is supplied by an independent liquid source, through a pressure regulator, the control of which takes into consideration the characteristics of the sealing device.

17. Sealing device according to claim 1, characterized in that the sealing liquid is a neutral liquid, independent from the fluid in the machine, for example water supplied from a tank, through a pressure regulator means.

* * * * *